(12) United States Patent
Ishida et al.

(10) Patent No.: US 9,178,381 B2
(45) Date of Patent: Nov. 3, 2015

(54) STORAGE BATTERY CONTROL DEVICE, CHARGING STATION, AND STORAGE BATTERY CONTROL METHOD

(75) Inventors: Takaharu Ishida, Hitachinaka (JP); Masahiro Watanabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 13/810,538

(22) PCT Filed: Aug. 1, 2011

(86) PCT No.: PCT/JP2011/067602
§ 371 (c)(1),
(2), (4) Date: Jan. 16, 2013

(87) PCT Pub. No.: WO2012/017985
PCT Pub. Date: Feb. 9, 2012

(65) Prior Publication Data
US 2013/0119947 A1 May 16, 2013

(30) Foreign Application Priority Data
Aug. 4, 2010 (JP) .................................. 2010-174986

(51) Int. Cl.
*H02J 7/04* (2006.01)
*H02J 7/16* (2006.01)
(Continued)

(52) U.S. Cl.
CPC ............... *H02J 7/045* (2013.01); *B60L 3/0046* (2013.01); *B60L 3/0069* (2013.01); *B60L 3/04* (2013.01);
(Continued)

(58) Field of Classification Search
CPC ............ B60L 11/1825; B60L 11/1862; B60L 2240/80; B60L 3/0046; H02J 3/14; Y02E 60/721; Y02T 10/5005; Y02T 10/7044; Y02T 10/705; Y02T 90/128; Y02T 90/14; Y04S 10/126; Y04S 20/222
USPC .................................. 320/157, 159, 162, 165
See application file for complete search history.

(56) References Cited

U.S. PATENT DOCUMENTS

2004/0124703 A1* 7/2004 Tani et al. ..................... 307/10.1
2006/0287763 A1* 12/2006 Ochi et al. ..................... 700/231
(Continued)

FOREIGN PATENT DOCUMENTS

CN         101627518 A     1/2010
JP         2003-092829 A   3/2003
(Continued)

OTHER PUBLICATIONS

Chinese Office Action received in corresponding Chinese Application No. 201180037749.8 dated Aug. 29, 2014.

*Primary Examiner* — Vuthe Siek
(74) *Attorney, Agent, or Firm* — Mattingly & Malur, PC

(57) ABSTRACT

The battery charging of electric vehicles, etc. is controlled so that the impact on the electric power system is lightened even when a lot of electric vehicles, etc. start the charging all at once. A device for controlling an electricity storage device installed in an electric vehicle or the like calculates a voltage drop by applying a load current at the time of performing the charging of the electricity storage device, and limits the charging quantity of the storage battery (installed in the electric vehicle or the like) based on the calculated voltage drop so that the voltage drop of the electric power system remains less than a prescribed level. Consequently, it becomes possible to reduce the voltage fluctuation around each of the electric vehicles, etc. that is about to execute the charging in cases where a lot of electric vehicles, etc. start the charging all at once.

8 Claims, 19 Drawing Sheets

(51) Int. Cl.
| | |
|---|---|
| *B60L 3/00* | (2006.01) |
| *B60L 3/04* | (2006.01) |
| *B60L 11/18* | (2006.01) |
| *H02J 3/14* | (2006.01) |
| *B60L 3/12* | (2006.01) |
| *H02J 7/02* | (2006.01) |
| *H02J 13/00* | (2006.01) |

(52) U.S. Cl.
CPC ............... *B60L 3/12* (2013.01); *B60L 11/184* (2013.01); *B60L 11/1816* (2013.01); *B60L 11/1825* (2013.01); *B60L 11/1844* (2013.01); *B60L 11/1846* (2013.01); *B60L 11/1848* (2013.01); *B60L 11/1862* (2013.01); *H02J 3/14* (2013.01); *H02J 7/02* (2013.01); *H02J 13/0024* (2013.01); *B60L 2230/16* (2013.01); *B60L 2230/40* (2013.01); *B60L 2240/527* (2013.01); *B60L 2240/529* (2013.01); *B60L 2240/547* (2013.01); *B60L 2240/549* (2013.01); *B60L 2240/70* (2013.01); *B60L 2240/80* (2013.01); *B60L 2250/10* (2013.01); *B60L 2250/16* (2013.01); *B60L 2270/145* (2013.01); *Y02E 60/721* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | |
|---|---|---|
| 2010/0217485 A1 | 8/2010 | Ichishi |
| 2010/0262566 A1 | 10/2010 | Yamamoto |
| 2011/0022222 A1* | 1/2011 | Tonegawa .................... 700/232 |

FOREIGN PATENT DOCUMENTS

| | | |
|---|---|---|
| JP | 2007-172535 A | 7/2007 |
| JP | 2007-295717 A | 11/2007 |
| JP | 2010/288345 A | 12/2010 |
| WO | 2009/069481 A1 | 6/2009 |
| WO | 2009/075313 A1 | 6/2009 |

* cited by examiner

F I G . 1
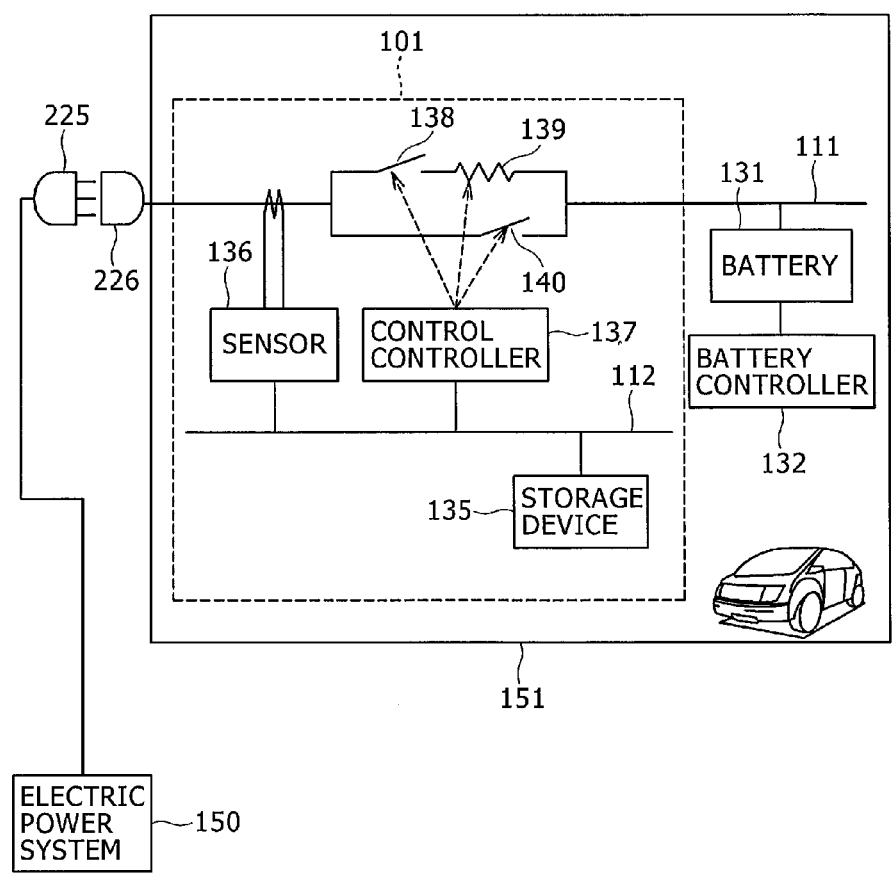

FIG.18

| BRANCH NAME | RESISTIVE COMPONENT | INDUCTIVE COMPONENT | CAPACITIVE COMPONENT | TAP RATIO |
|---|---|---|---|---|
| #1—#2 | | | | |
| #2—#3 | | | | |
| #3—#4 | | | | |
| #4—#5 | | | | |

~250

| NODE NAME | PRESENCE/ ABSENCE OF GENERATOR | VOLTAGE SPECIFIED VALUE | VOLTAGE INITIAL VALUE | PG | QG | PL | QL | SCShR |
|---|---|---|---|---|---|---|---|---|
| #1 | | | | | | | | |
| #2 | | | | | | | | |
| #3 | | | | | | | | |
| #4 | | | | | | | | |

251

STORAGE BATTERY CONTROL DEVICE, CHARGING STATION, AND STORAGE BATTERY CONTROL METHOD

INCORPORATION BY REFERENCE

This application claims priority to Japanese Patent Application No. 2010-174986 filed on Aug. 4, 2010, the entire disclosure of which is incorporated herein by reference.

TECHNICAL FIELD

The present invention relates to a storage battery control device, a charging station, and a storage battery control method. In particular, the present invention relates to a storage battery control device, a charging station, and a storage battery control method suitable for reducing ill effects on voltage stability in an electric power system.

BACKGROUND ART

A great number of customers are connected to an electric power system. In such an electric power system, it is desirable that the electric power to be consumed by the customers be stably supplied from the supplier. In order to realize the stable supply of electric power, there has been proposed a technique that prevents system down of the electric power system by preparing for power outage, instantaneous power interruption, etc. that might occur in the near future by employing a duplexed (redundant) power feeding system, as described in JP, A 2007-172535, for example.

PRIOR ART LITERATURE

Patent Literature

Patent Literature 1: JP, A 2007-172535

SUMMARY OF THE INVENTION

Problem to be Solved by the Invention

In recent years, however, a lot of new devices are being connected to the electric power system in addition to the conventional power generation facilities and customer loads. Storage batteries can be taken as an example of such new devices. Especially, storage batteries installed in vehicles are expected to receive and supply a great amount of electric energy from/to the electric power system in the near future. For the storage batteries (especially, for the charging of electric vehicles), the technique called "Regulated", performing the charging "at the convenience on the electric vehicle's side" (at the electric vehicle's convenience) based on the SOC (State Of Charge) of the battery, is employed in many cases. There are also cases where the charging time is controlled by using a timer. From the electric power system's viewpoint, concerns are rising that problems with the quality of the electric power (especially, with the voltage stability) can occur on the electric power system's side when a lot of electric vehicles are introduced.

It is therefore the primary object of the present invention to provide a storage battery control device, a charging station and a storage battery control method capable of reducing the ill effects on the electric power system caused by the charging operation of storage batteries such as those of electric vehicles, etc. starting the charging all at once.

Means for Solving the Problem

To achieve the above object, a storage battery control device in accordance with the present invention is configured to comprise: a calculation unit which calculates a voltage drop caused to an electric power system when a storage battery is connected to the system based on limitation time loaded state information regarding a loaded state in which a load current is applied from the electric power system to the storage battery via a load limiting element; and a control unit which outputs a control command signal based on the calculated voltage drop to a control device which controls the load on the storage battery.

Effect of the Invention

According to the present invention, the reduction of the ill effects of the charging operation on the electric power system becomes possible.

The other objects, features and advantages of the invention will become apparent from the following description of the embodiments of the invention taken in conjunction with the accompanying drawings.

BRIEF DESCRIPTION OF THE DRAWINGS

FIG. 1 shows an example of the configuration of a storage battery system interconnection control device installed in an electric vehicle.

FIG. 18 shows an example of data for current calculation.

MODE FOR CARRYING OUT THE INVENTION

Figure 2:
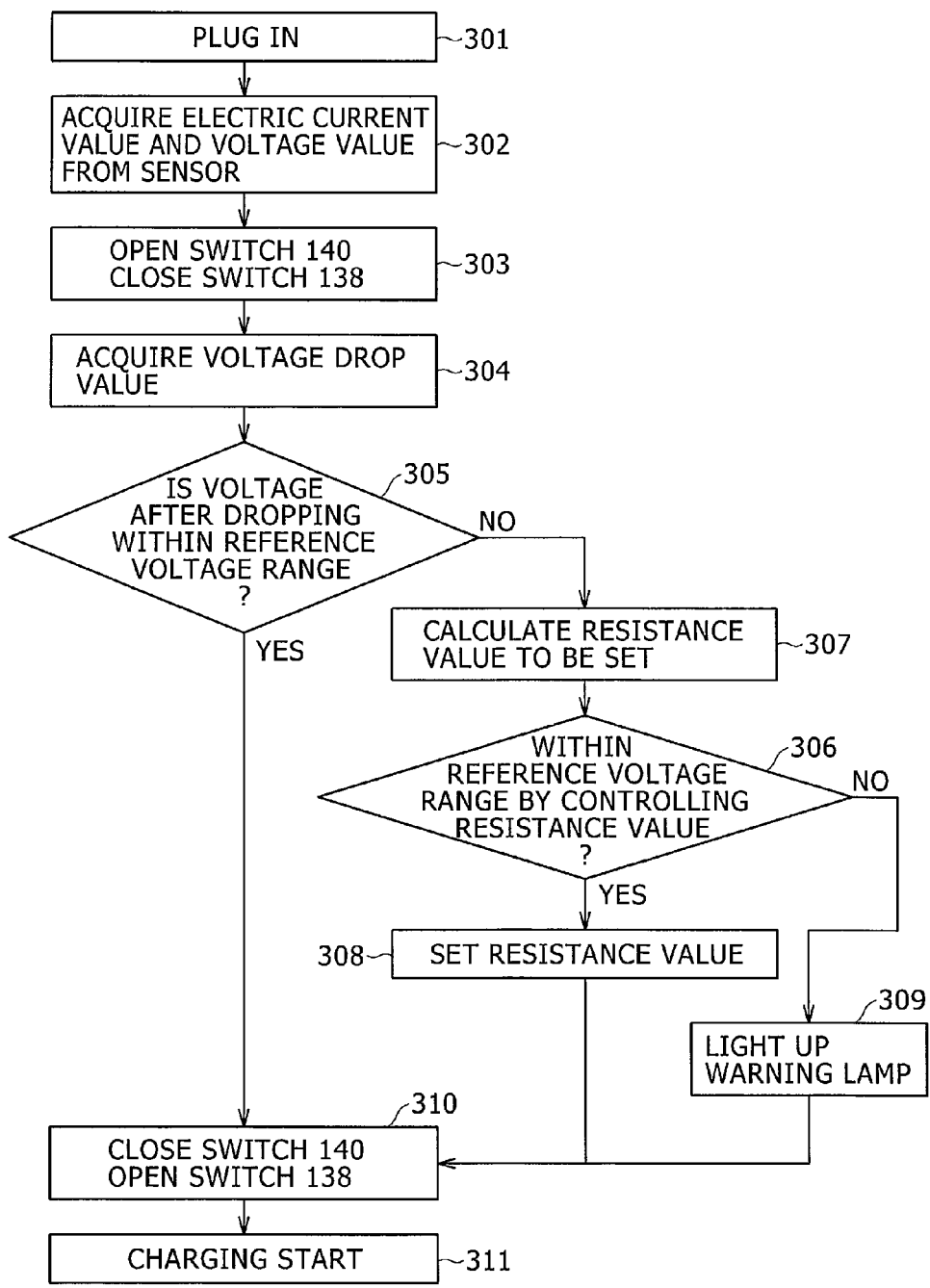
FIG. 2 shows an example of processing by the storage battery system interconnection control device installed in an electric vehicle.

Referring now to the drawings, a description will be given in detail of preferred embodiments in accordance with the present invention. First, the outline of each embodiment will be explained for a better grasp thereof.

In a first embodiment designed assuming the charging method called "Regulated", in order to reduce voltage fluctuation around each electric vehicle about to execute the charging in cases where a lot of electric vehicles start the charging all at once, an electric vehicle is equipped with a system interconnection control device which is characterized by a step of calculating a voltage drop by applying a load current and a step of controlling the charging quantity of the electric vehicle based on the voltage drop.

In a second embodiment designed assuming the charging method called "Regulated", in order to reduce voltage fluctuation around each electric vehicle about to execute the charging in cases where a lot of electric vehicles start the charging all at once, a charging station is equipped with a system interconnection control device which is characterized by a step of calculating the voltage drop by applying a load current and a step of controlling the charging quantity of the electric vehicle based on the voltage drop.

In a third embodiment designed assuming the charging method called "Regulated", in order to reduce voltage fluctuation around each electric vehicle about to execute the charging in cases where a lot of electric vehicles start the charging all at once, a control box of a charging cable is equipped with a system interconnection control device which is characterized by a step of calculating the voltage drop by applying a load current and a step of controlling the charging quantity of the electric vehicle based on the voltage drop.

In a fourth embodiment designed assuming the charging method called "Regulated", a control center for executing an authentication billing process is provided while also reducing the voltage fluctuation around each electric vehicle about to execute the charging in cases where a lot of electric vehicles start the charging all at once.

In a fifth embodiment designed assuming the charging method called "Non-Regulated", in order to prevent a voltage drop of the electric power system in cases where a lot of electric vehicles start the charging all at once, a storage battery system interconnection control device is installed in an electric vehicle, and a control center having jurisdiction over electric vehicles and commanding and controlling the charging quantity of each electric vehicle is provided.

In a sixth embodiment designed assuming the charging method called "Non-Regulated", in order to prevent a voltage drop of the electric power system in cases where a lot of electric vehicles start the charging all at once, a storage battery system interconnection control device is installed in an electric vehicle charging station, and a control center having jurisdiction over electric vehicles and commanding and controlling the charging quantity of each electric vehicle is provided.

In a seventh embodiment designed assuming the charging method called "Non-Regulated", in order to prevent a voltage drop of the electric power system in cases where a lot of electric vehicles start the charging all at once, a storage battery system interconnection control device is installed in an electric vehicle charging cable, and a control center having jurisdiction over electric vehicles and commanding and controlling the charging quantity of each electric vehicle is provided.

First Embodiment

In the following, the first embodiment of the present invention will be described referring to figures. FIG. 1 shows an embodiment in which a storage battery system interconnection control device in accordance with the present invention is installed as a component of an electric vehicle. The reference character 101 represents the storage battery system interconnection control device in accordance with the present invention. The storage battery system interconnection control device 101 comprises a power line 111, a communication line 112, a storage device 135, a sensor 136, a control controller 137, switches 138 and 140, and a load resistor 139. The electric vehicle (hereinafter referred to also as an "EV") 151 is equipped with the storage battery system interconnection control device 101, a battery 131, a battery controller 132 and a charging inlet 226.

The charging inlet 226 is connected to a charging cable (which is connected to an electric power system 150) via a charging plug 225 and supplies electric power to the EV 151. The electric power supplied from the electric power system 150 to the EV 151 via the charging plug 225 and the charging inlet 226 is supplied to the battery 131 via the power line 111 under the control of the battery controller 132. Referring to FIG. 1, the sensor 136 measures the electric current and the voltage at a position just after the charging inlet 226 and transmits the measurement values to the control controller 137 and the storage device 135 via the communication line 112. The storage device 135 has functions of temporarily accumulating the measurement values and outputting and writing the measurement values to an external storage device as needed. The control controller 137 is capable of opening and closing the switches 138 and 140 shown in FIG. 1 and changing the resistance value of the load resistor 139 to which various resistance values can be set.

The storage battery system interconnection control device 101 is a device which starts the battery charging after checking whether the charging quantity required by the storage battery of the EV does not cause ill effects on surrounding electric power users (especially, problems related to the voltage drop).

Next, the function of the storage battery system interconnection control device 101 will be explained below referring to FIG. 2 by taking the CASE C charging method defined in IEC61851-1 as an example. In step 301, the charging plug for the charging with the electric power supplied from the electric power system is plugged into the charging inlet of the EV. At the same time, the electric current value and the voltage value measured by the sensor 136 are transmitted to the control controller 137 and the storage device 135 (step 302). In the next step 303, the control controller transmits commands for opening the switch 140 (which has been closed in its initial state) and closing the switch 138 (which has been open in its initial state) to the switches 140 and 138, respectively. Magnet switches commonly used are sufficient for these switches 140 and 138.

Since electric current via the load resistor 139 passes through the circuit after completion of the switching operation (step 303), the electric current and the voltage at that time are measured by the sensor 136 (step 304) and the measurement values are acquired by the control controller 137. Incidentally, it is desirable that the resistance value of the load resistor 139 (load resistance) be previously set in the initial state so that the electric power passing through the load resistance for the calculation of the degree of the voltage drop is equivalent to the electric power at the time of the EV charging. In step 305, the control controller 137 judges whether the voltage value acquired after the switching operation (step 303) had dropped below a reference voltage range or not. If the voltage value had not dropped below the reference voltage range, the switch 140 is closed and the switch 138 is opened in step 310, by which the charging of the EV is started (step 311).

In contrast, when the voltage value acquired in the step 304 is not within the reference voltage range in the judgment step 305, a resistance value to be set to the load resistor 139 is calculated in step 307. This value is determined by calculating a resistance value that compensates for the voltage deviation based on the electric current value and the voltage value acquired by the sensor 136. If it is judged in step 306 that the voltage can be fit in the reference voltage range by the step 307, the calculated resistance value is set to the load resistor 139 (step 308) and the process advances to the step S310 to start the charging of the EV. If it is judged in the step 306 that the voltage deviation cannot be eliminated, a warning lamp is displayed in an arbitrary method in a prescribed area of an on-vehicle navigation system, for example (step 309). Thereafter, the switching operation is performed by the control controller (step 310), by which the charging of the EV is started.

Figure 3:
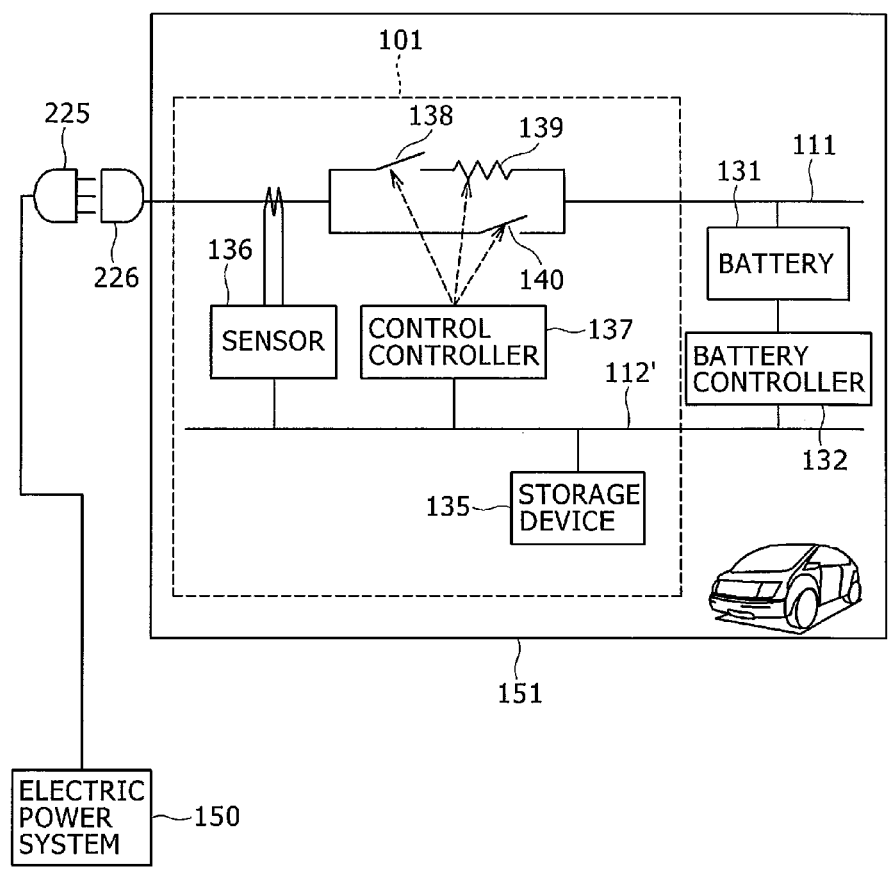
FIG. 3 shows another example of the configuration of the storage battery system interconnection control device installed in an electric vehicle.

FIG. 3 shows another example of the configuration of the EV, in which the battery controller 132 is capable of communicating its information with the control controller 137 via a communication line 112' inside the EV. In this case, the control controller 137 is allowed to acquire parameters of the battery 131, such as the SOC (State Of Charge) and the internal voltage of the battery, from the battery controller 132.

There are cases where the electric energy required by the battery of the EV cannot be acquired in the minimum time from the electric power system when the control is performed by the control controller based on the aforementioned parameters of the battery, that is, cases where the charging is performed by using a longer time than planned in order to prevent the surrounding voltages from significantly dropping during the charging of the EV battery from the system with the electric energy required by the EV battery. In such cases, it is possible to set a cost difference to the electricity charge paid by the EV user based on the overtime (extra time that was necessary).

Figure 4:
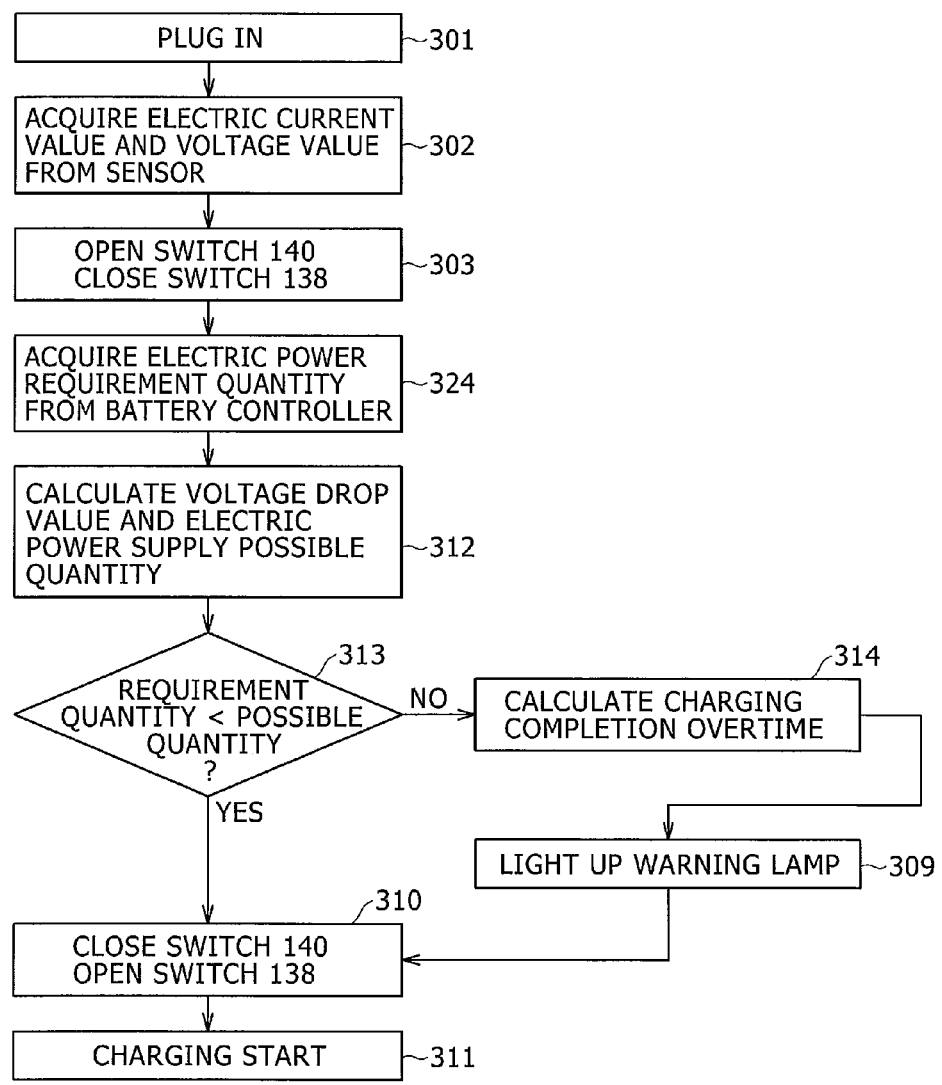
FIG. 4 shows another example of processing by the storage battery system interconnection control device installed in an electric vehicle.

In the following, the operation of the control controller employing this method will be described referring to FIG. 4. In step 301, the charging plug for the charging with the electric power supplied from the electric power system is plugged into the charging inlet of the EV. At the same time, the electric current value and the voltage value measured by the sensor 136 are transmitted to the control controller 137 and the storage device 135 (step 302). In the next step 303, the control controller transmits commands for opening the switch 140 (which has been closed in its initial state) and closing the switch 138 (which has been open in its initial state) to the switches 140 and 138, respectively. In the next step 324, the control controller acquires an electric power requirement quantity of the battery 131 via the battery controller. In the next step 312, the control controller calculates an electric power supply possible quantity from the voltage drop value after the switch opening/closing step by using the sensor 136. In step 313, the control controller compares the electric power requirement quantity of the EV battery with the electric power supply possible quantity. If the electric power supply possible quantity is larger than the electric power requirement quantity of the EV, the control controller closes and opens the switches 140 and 138, respectively (step S310) and starts the charging of the EV (step S311). If the charging requirement quantity of the EV battery is larger in the step 313, the control controller calculates charging completion overtime in step 314.

Figure 5:
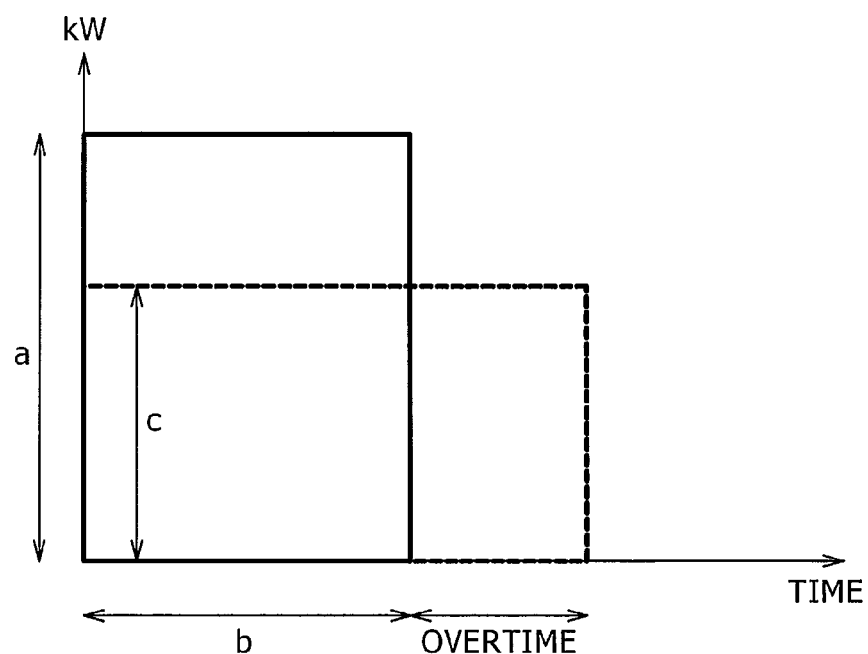
FIG. 5 is a graph showing a charging delay time.

This situation will be explained here referring to FIG. 5. In FIG. 5, the vertical axis represents the electric power (kW) and the horizontal axis represents time. When the requirement quantity is larger than the electric power supply possible quantity, charging the EV battery with a quantity larger than the electric power supply possible quantity is impossible. The requirement quantity of the EV battery can be determined from the rated charging quantity of the EV battery and the value of the SOC. The time necessary for the charging can be determined by dividing the value of the requirement quantity by a supply possible electric power. This time corresponds to the reference character b in the graph of FIG. 5. The reference character a in the graph represents the electric energy per unit time (electric power). Since the storage battery system interconnection control device has to perform the charging of the EV battery with electric power lower than an electric power requirement for the EV battery, letting "c" represent the charging electric power per unit time in this case, the overtime from the charging time originally expected by the EV can be determined by using the following expression:

$$(\text{overtime}) = b \times (c-a)/c$$

After determining the overtime, a warning lamp is lit up on a display device in the EV (step 309) to inform the EV user that the charging performed this time is not the ordinary charging. Thereafter, the EV charging is started (step 311) via the switching operation (step 310).

As described above, according to the first embodiment of the present invention, the electric vehicle is equipped with the system interconnection control device which is characterized by the step of calculating the voltage drop by applying the load current at the time of performing the charging from the electric power system to the storage battery of the electric vehicle and the step of controlling the charging quantity of the electric vehicle based on the voltage drop. This embodiment makes it possible to control the charging quantity of the electric vehicle so as to reduce the ill effects on the surrounding loads in the electric power system to which the electric vehicle is connected. Consequently, it becomes possible in an autonomous distributed manner to maintain the surrounding voltages at a certain level or higher even when a lot of electric vehicles are charged all at once.

Second Embodiment

Figure 6:
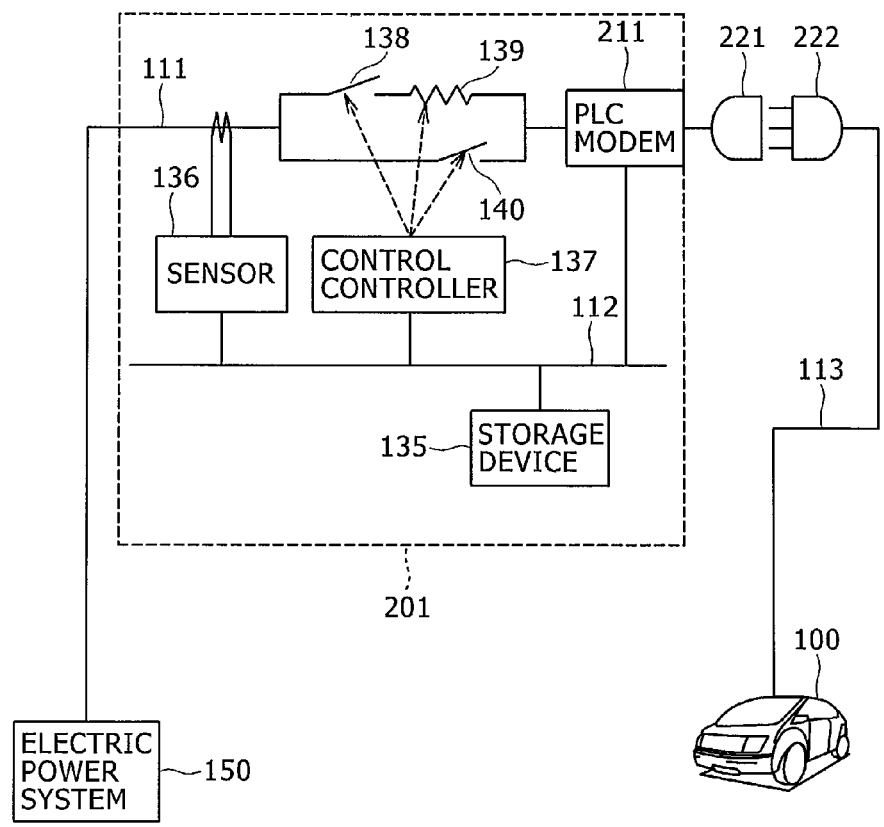
FIG. 6 shows an example of the configuration of a storage battery system interconnection control device installed in a charging station.

A second embodiment of the present invention will be described below with reference to figures. In the following explanation of this embodiment, elements differing from those explained above will be explained; explanation of equivalent elements is omitted for brevity. FIG. 6 shows an embodiment in which a storage battery system interconnection control device 201 in accordance with the present invention is installed in an electric vehicle charging station. The reference character 201 also represents the charging station equipped with the storage battery system interconnection control device in accordance with the present invention. The charging station may also be equipped with a display device and/or an operation switch not shown in FIG. 6. The storage battery system interconnection control device 201 comprises a power line 111, a communication line 112, a storage device 135, a sensor 136, a control controller 137, switches 138 and 140, a load resistor 139, a PLC modem 211, and a charging inlet 221.

The charging station 201 is supplied with the electric power from the electric power system 150 via the power line 111. The charging station is connected to a charging plug 222 (which is connected to an EV 100) via the charging inlet 221 and communicates electric power. It is assumed that communication of information between the EV and the inlet 221 (to which the charging plug from the EV is connected) is possible by means of electric power line communication typified by PLC (Power Line Communication). Although not illustrated, the EV 100 is equipped with components equivalent to the battery 131 and the battery controller 132 shown in FIG. 1 (ditto for the subsequent embodiments). Through the PLC Communication, the control controller is capable of acquiring the SOC and the internal voltage of the storage battery of the EV via the PLC modem 211 and the communication line 112. The communication method employed for the PLC Communication may either be the commonly used TCP/IP (Transport Protocol/Internet Protocol) or a unique communication method having special features.

Figure 7:
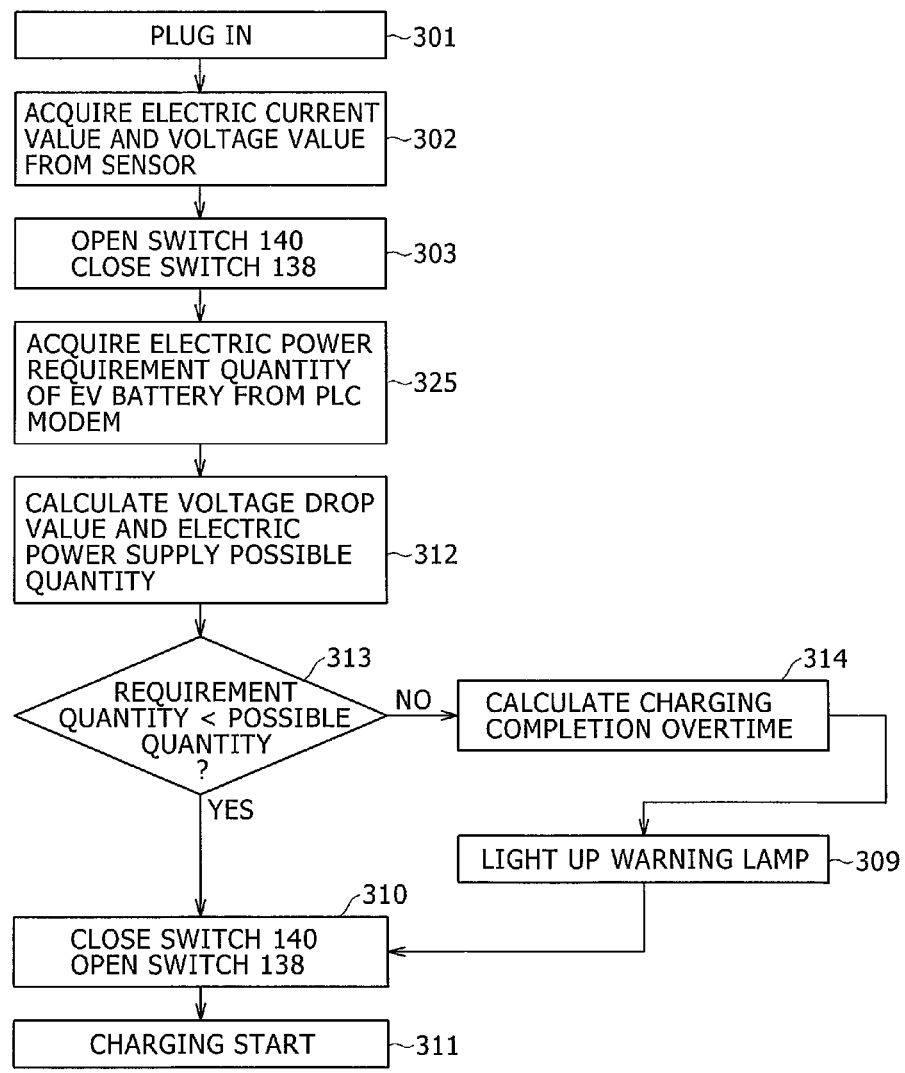
FIG. 7 shows an example of processing by the storage battery system interconnection control device installed in a charging station.

A method for starting the charging after checking whether the charging quantity required by the EV's storage battery does not cause ill effects on surrounding electric power users (especially, problems related to the voltage drop) by using the storage battery system interconnection control device 201 (configured as shown in FIG. 6) will be explained below referring to FIG. 7. The following explanation will be given by taking the CASE A charging method (in which the charging cable is fixed to the EV) or the CASE B charging method (in which the cable is fixed to neither the charger or the EV) defined in IEC61851-1 as an example. In step 301, the aforementioned inlet 221 and plug 222 are connected together. At the same time, the electric current value and the voltage value measured by the sensor 136 are transmitted to the control controller 137 and the storage device 135 (step 302). In the next step 303, the control controller transmits commands for opening the switch 140 (which has been closed in its initial state) and closing the switch 138 (which has been open in its initial state) to the switches 140 and 138, respectively. After finishing the switching operation (step 303), the control controller calculates the electric power requirement quantity of the EV battery from the information supplied via the PLC modem (step 325). The control controller 137 is capable of performing this calculation by acquiring the product of the total capacity and the SOC of the EV's storage battery and the charging electric power requirement quantity per unit time required by the EV's battery controller. In the next step 312, the control controller calculates the electric power supply possible quantity from the voltage drop value after the switch opening/closing step by using the sensor 136. In step 313, the control controller compares the electric power requirement quantity of the EV battery with the electric power supply possible quantity. If the electric power supply possible quantity is larger than the electric power requirement quantity of the EV, the control controller closes and opens the switches 140 and 138, respectively (step S310) and starts the charging of the EV (step S311). If the charging requirement quantity of the EV battery is larger in the step 313, the control controller calculates the charging completion overtime in step 314.

This situation will be explained referring to FIG. 5. In FIG. 5, the vertical axis represents the electric power (kW) and the horizontal axis represents time. When the requirement quantity is larger than the electric power supply possible quantity, charging the EV battery with a quantity larger than the electric power supply possible quantity is impossible. The requirement quantity of the EV battery can be determined from the rated charging quantity of the EV battery and the value of the SOC. The time necessary for the charging can be determined by dividing the value of the requirement quantity by a supply possible electric power. This operation is equivalent to that in the above explanation referring to FIG. 5. After determining the overtime, a warning lamp is lit up on a display device in the EV (step 309) to inform the EV user that the charging performed this time is not the ordinary charging. Thereafter, the EV charging is started (step 311) via the switching operation (step 310).

Figure 8:
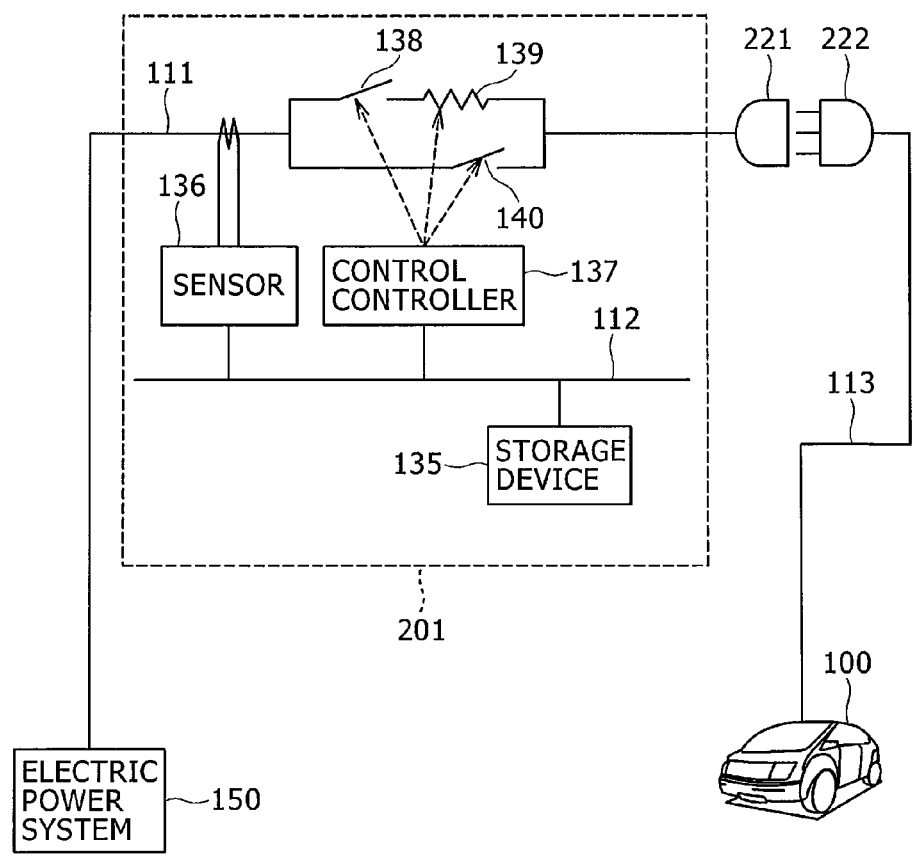
FIG. 8 shows another example of the configuration of the storage battery system interconnection control device installed in a charging station.

Incidentally, while the configuration shown in FIG. 6 has assumed that the charging station is equipped with the PLC modem capable or recognizing PLC and the EV also supports the PLC communication, there exist EVs not supporting PLC. Therefore, a configuration capable of dealing with such EVs not supporting PLC is also necessary. Such a configuration is shown in FIG. 8, wherein the PLC modem 211 and the communication line connecting the PLC modem and the communication line 112 are left out compared to FIG. 6. The processing by the control controller 137 and the procedure for starting the charging in this configuration are equivalent to those shown in FIG. 2 except for the connection between the inlet 221 and the plug 222 in the plug-in step 301.

As described above, according to the second embodiment of the present invention, the charging station is equipped with the system interconnection control device which is characterized by the step of calculating the voltage drop by applying the load current at the time of performing the charging from the electric power system to the storage battery of the electric vehicle and the step of controlling the charging quantity of the electric vehicle based on the voltage drop. This embodiment makes it possible to control the charging quantity of the electric vehicle so as to reduce the ill effects on the surrounding loads in the electric power system to which the electric vehicle is connected. Consequently, it becomes possible in an autonomous distributed manner to maintain the surrounding voltages at a certain level or higher even when a lot of electric vehicles are charged all at once.

Third Embodiment

Figure 9:
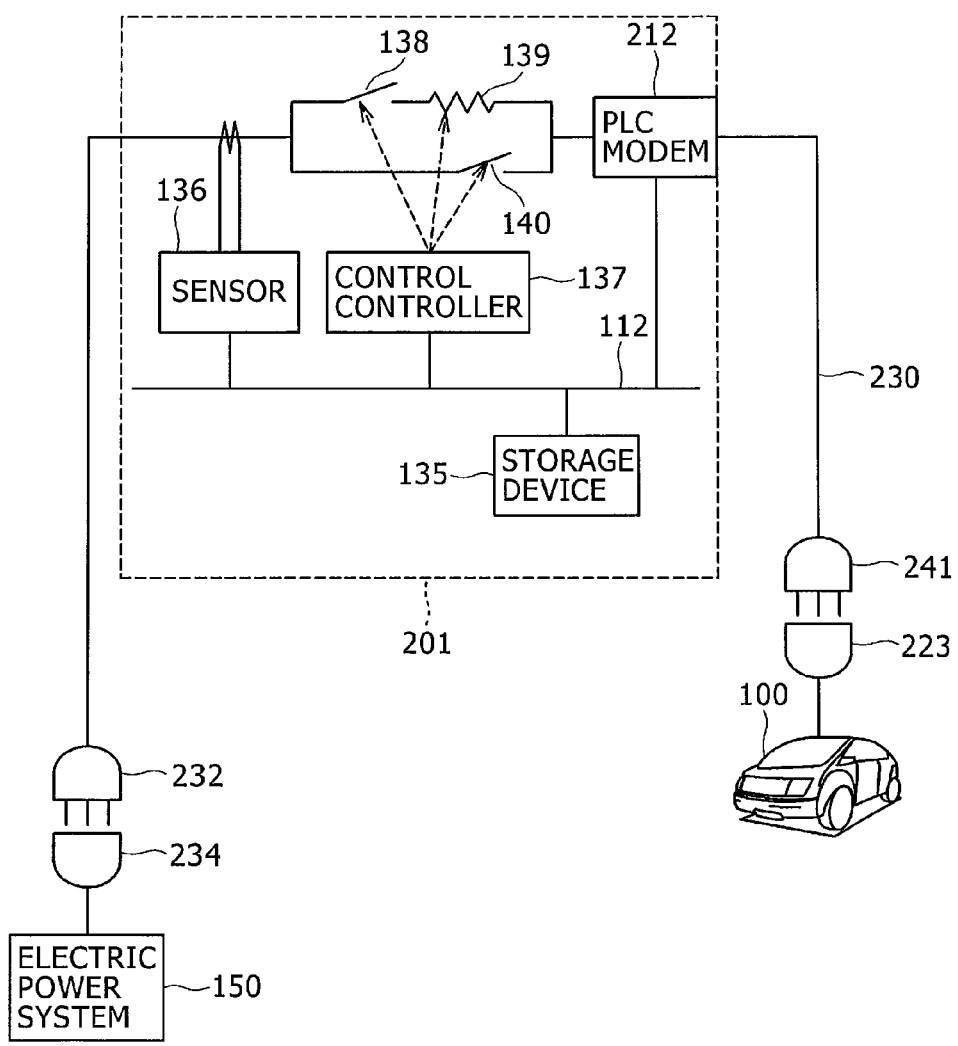
FIG. 9 shows an example of the configuration of a storage battery system interconnection control device installed in a charging cable.

A third embodiment of the present invention will be described below with reference to figures. FIG. 9 shows an embodiment in which a storage battery system interconnection control device in accordance with the present invention is installed in a control box of a charging cable which is used for the charging of electric vehicles. This embodiment corresponds to the MODE 2, CASE B charging described in IEC61851-1 specifying the charging of electric vehicles. The reference character 271 represents the charging cable equipped with the storage battery system interconnection control device in accordance with the present invention. The charging cable 271 may also be equipped with a display device, an operation switch and/or an earth leakage breaker not shown in FIG. 8. The storage battery system interconnection control device comprises a power line 111, a communication line 112, a storage device 135, a sensor 136, a control controller 137, switches 138 and 140, a load resistor 139, a PLC modem 212, and charging plugs 241 and 232.

The charging cable 271 receives the electric power supplied from the electric power system 150 with its power line 230. The charging cable is connected to a charging inlet 223 of an EV 100 via the charging plug 241 and communicates electric power. The other charging plug 232 is connected to a charging inlet 234. It is assumed that communication of information between the charging plug 241 (connected to the EV) and the inlet 223 is possible by means of electric power line communication typified by PLC (Power Line Communication). Through the PLC Communication, the control controller 137 is capable of acquiring the SOC and the internal voltage of the storage battery of the EV via the PLC modem 212 and the communication line 112. The communication method employed for the PLC Communication may either be the commonly used TCP/IP (Transport Protocol/Internet Protocol) or a unique communication method having special features.

Figure 10:
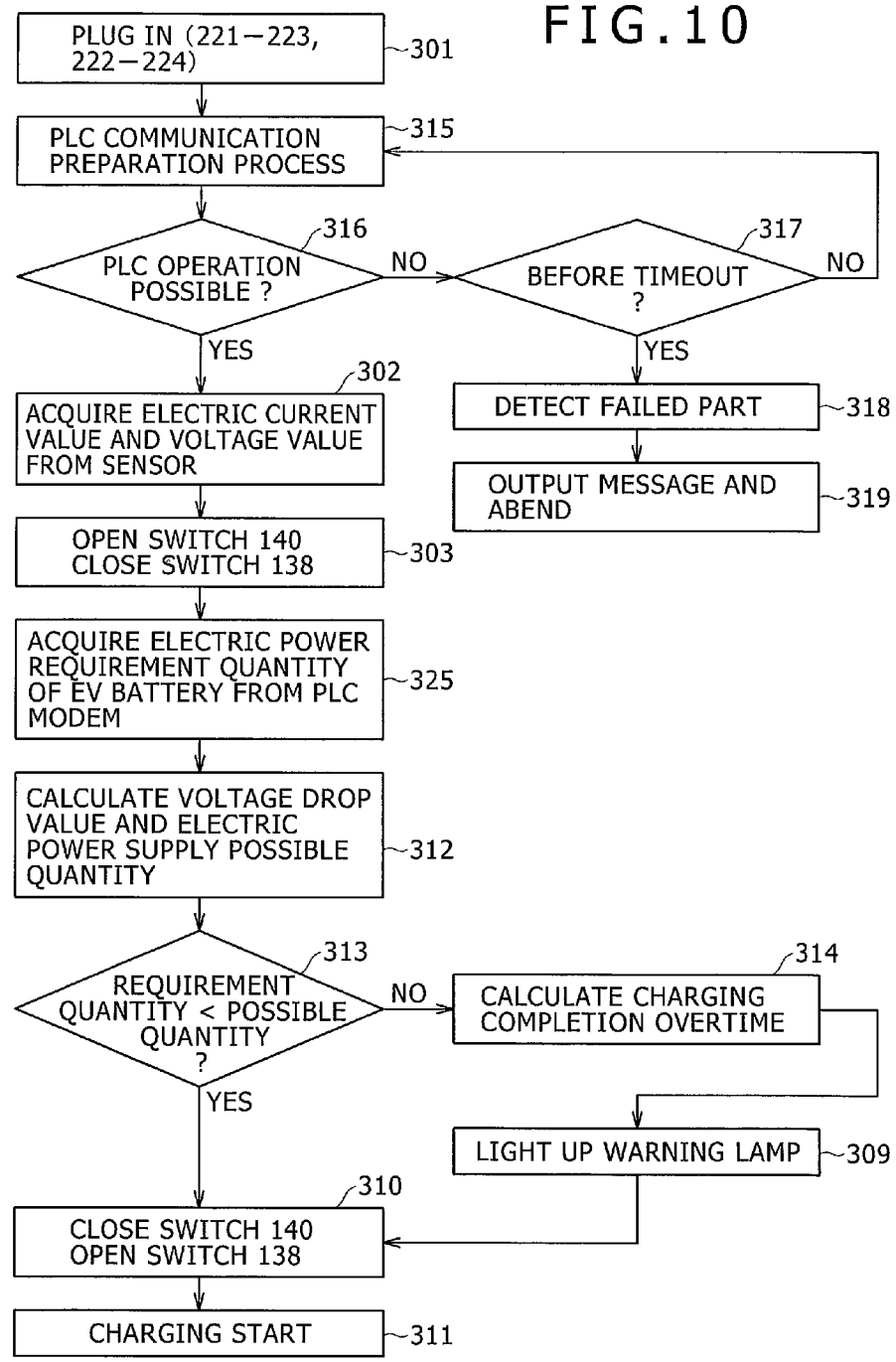
FIG. 10 shows an example of processing by the storage battery system interconnection control device installed in a charging cable.

A procedure for starting the charging after checking whether the charging quantity required by the EV's storage battery does not cause ill effects on surrounding electric power users (especially, problems related to the voltage drop) by using the storage battery system interconnection control device 201 (configured as shown in FIG. 9) will be explained below referring to FIG. 10. In step 301, the aforementioned inlet 223 and plug 241 are connected together, and the plug 232 and the inlet 234 are connected together.

In the next step 315, a process for preparing for the PLC communication is started. For example, when the power is supplied, whether the ACK signal is returned from the other device or not is judged by using a packet transmission function (unshown) of the PLC modem. If the ACK signal is not returned in step 316, whether a preset timeout period has elapsed or not is checked (step 317). If the timeout period has not elapsed, the process returns to the step 315 to repeat subsequent steps. If the timeout period is judged to have elapsed in the step 317, the process advances to step 318 and judges whether or not either the inlet 223 or 234 has failed. This judgment can be made by transmitting a packet from the PLC modem 212 to the inlets 223 and 234 and checking whether the ACK signal is returned or not as mentioned above. Information on the failed part (inlet) detected in the step 318 is displayed on a display device or outputted as a log file (step 319) and the process is ended.

If the return of the ACK signal is detected in the step 316, the electric current value and the voltage value measured by the sensor 136 are transmitted to the control controller 137 and the storage device 135 (step 302). In the next step 303, the control controller transmits commands for opening the switch 140 (which has been closed in its initial state) and closing the switch 138 (which has been open in its initial state) to the switches 140 and 138, respectively. After finishing the switching operation (step 303), the control controller calculates the electric power requirement quantity of the EV battery from the information supplied via the PLC modem (step 325). The control controller 137 is capable of performing this calculation by acquiring the product of the total capacity and the SOC of the EV's storage battery and the charging electric power requirement quantity per unit time required by the EV's battery controller. In the next step 312, the control controller calculates the electric power supply possible quantity from the voltage drop value after the switch opening/closing step by using the sensor 136. In step 313, the control controller compares the electric power requirement quantity of the EV battery with the electric power supply possible quantity. If the electric power supply possible quantity is larger than the electric power requirement quantity of the EV, the control controller closes and opens the switches 140 and 138, respectively (step S310) and starts the charging of the EV (step S311). If the charging requirement quantity of the EV battery is larger in the step 313, the control controller calculates the charging completion overtime in step 314.

This situation will be explained referring to FIG. 5. In FIG. 5, the vertical axis represents the electric power (kW) and the horizontal axis represents time. When the requirement quantity is larger than the electric power supply possible quantity, charging the EV battery with a quantity larger than the electric power supply possible quantity is impossible. The requirement quantity of the EV battery can be determined from the rated charging quantity of the EV battery and the value of the SOC. The time necessary for the charging can be determined by dividing the value of the requirement quantity by a supply possible electric power. This operation is equivalent to that in the above explanation referring to FIG. 5. After determining the overtime, a warning lamp is lit up on a display device in the EV (step 309) to inform the EV user that the charging performed this time is not the ordinary charging. Thereafter, the EV charging is started (step 311) via the switching operation (step 310).

Figure 11:
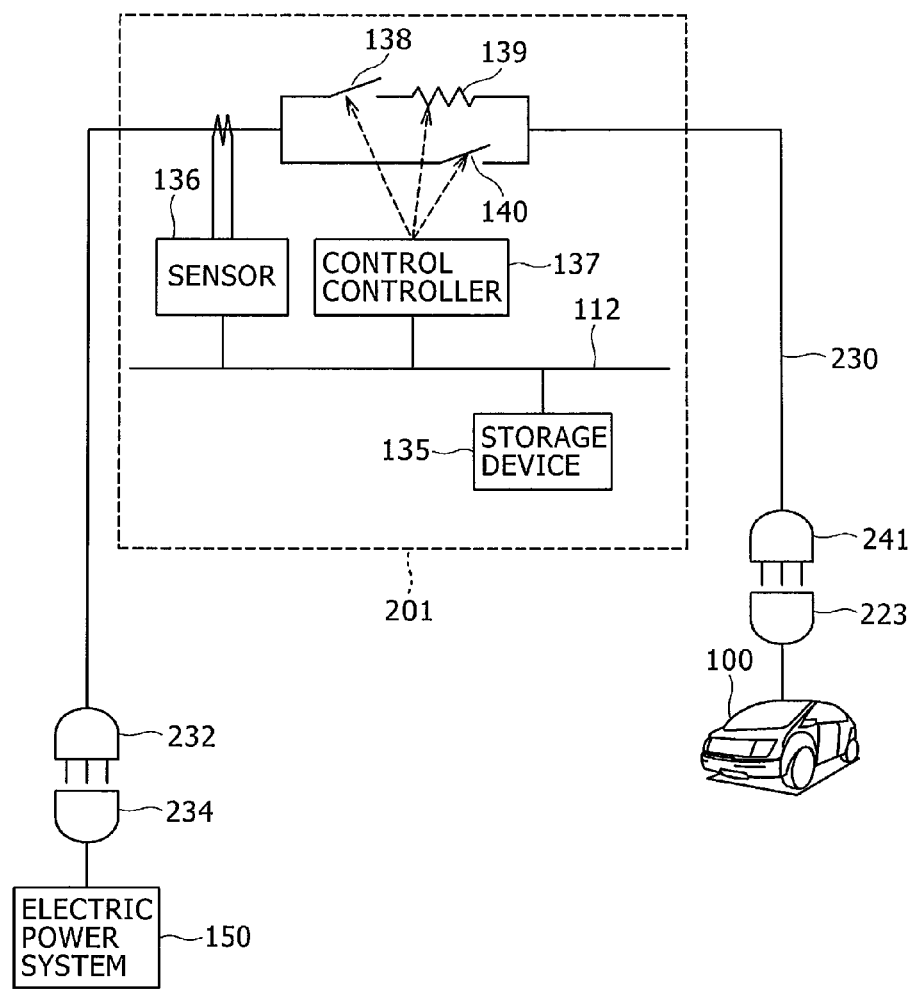
FIG. 11 shows another example of the configuration of the storage battery system interconnection control device installed in a charging cable.

FIG. 11 shows a configuration in which the control box of the charging cable is not equipped with the PLC modem differently from FIG. 9. In FIG. 11, the PLC modem 211 and the communication line connecting the PLC modem and the communication line 112 are left out compared to FIG. 9. The processing by the control controller 137 and the procedure for starting the charging in this configuration are equivalent to those shown in FIG. 2 except for the connection between the inlet 234 and the plug 232 and the connection between the inlet 223 and the plug 241 in the plug-in step 301.

As described above, according to the third embodiment of the present invention, the control box of the charging cable is equipped with the system interconnection control device which is characterized by the step of calculating the voltage drop by applying the load current at the time of performing the charging from the electric power system to the storage battery of the electric vehicle and the step of controlling the charging quantity of the electric vehicle based on the voltage drop. This embodiment makes it possible to control the charging quantity of the electric vehicle so as to reduce the ill effects on the surrounding loads in the electric power system to which the electric vehicle is connected. Consequently, it becomes possible in an autonomous distributed manner to maintain the surrounding voltages at a certain level or higher even when a lot of electric vehicles are charged all at once.

Fourth Embodiment

Figure 12:
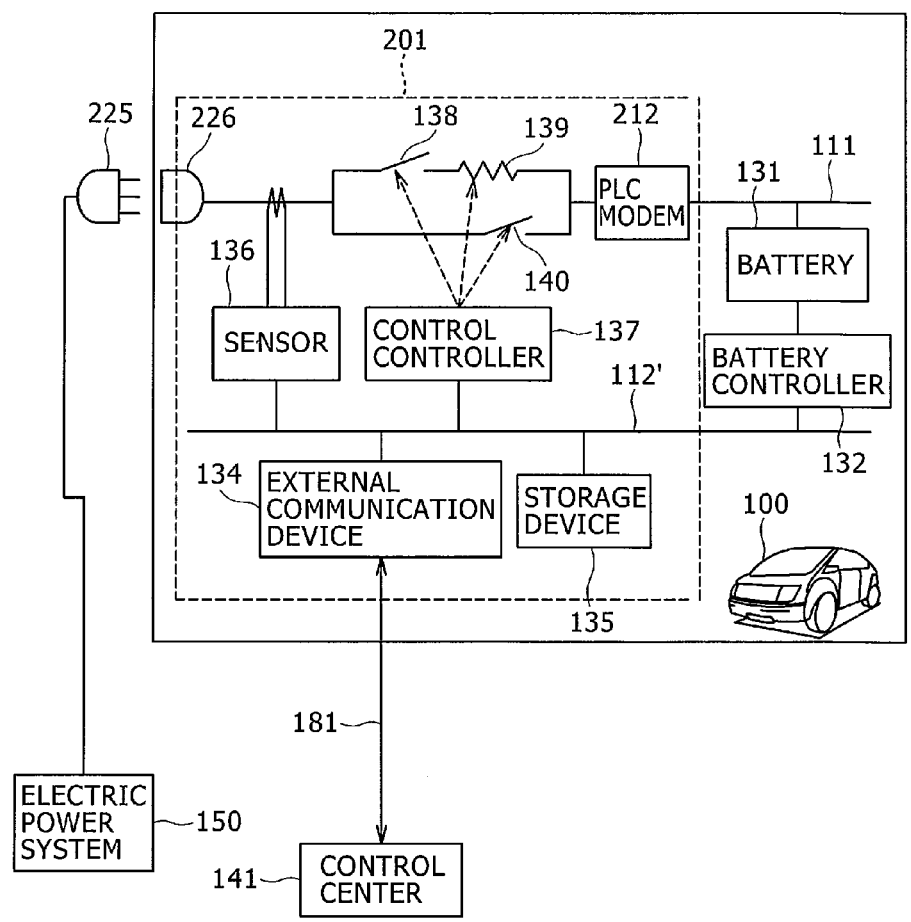
FIG. 12 shows an example of the configuration of a storage battery system interconnection control device installed in an electric vehicle connected to a control center.

A fourth embodiment of the present invention will be described below with reference to figures. FIG. 12 shows an embodiment in which a storage battery system interconnection control device in accordance with the present invention is installed as a component of an electric vehicle and the storage battery system interconnection control device is equipped with an external communication device to be capable of communicating data with a control center outside the electric vehicle. The reference character 101 represents the storage battery system interconnection control device in accordance with the present invention. The storage battery system interconnection control device comprises a power line 111, a communication line 112', an external communication device 134, a storage device 135, a sensor 136, a control controller 137, switches 138 and 140, and a load resistor 139. The electric vehicle (EV) 151 is equipped with the storage battery system interconnection control device 101, a battery 131, a battery controller 132 and a charging inlet 226. The battery controller 132 is connected to the communication line 112'. The external communication device 134 is connected to a control center 141 via a communication circuit 181.

The charging inlet 226 is connected to a charging cable (which is connected to an electric power system 150) via a charging plug 225 and supplies electric power to the EV 151. The electric power supplied from the electric power system 150 to the EV 151 via the charging plug 225 and the charging inlet 226 is supplied to the battery 131 via the power line 111 under the control of the battery controller 132. Referring to FIG. 12, the sensor 136 measures the electric current and the voltage at a position just after the charging inlet 226 and transmits the measurement values to the control controller 137 and the storage device 135 via the communication line 112'. The storage device 135 has functions of temporarily accumulating the measurement values and outputting and writing the measurement values to an external storage device as needed. The external communication device 134 is connected to the communication line 112' and transfers control signals from the control center 141 (communicated via the communication circuit 181) to the control controller via the communication line 112'. It is also possible to accumulate the measurement information from the sensor 136 in the control center 141 via the communication line 112' and the communication circuit 181. The control controller 137 is capable of opening and closing the switches 138 and 140 shown in FIG. 12 and changing the resistance value of the load resistor 139 to which various resistance values can be set.

Figure 13:
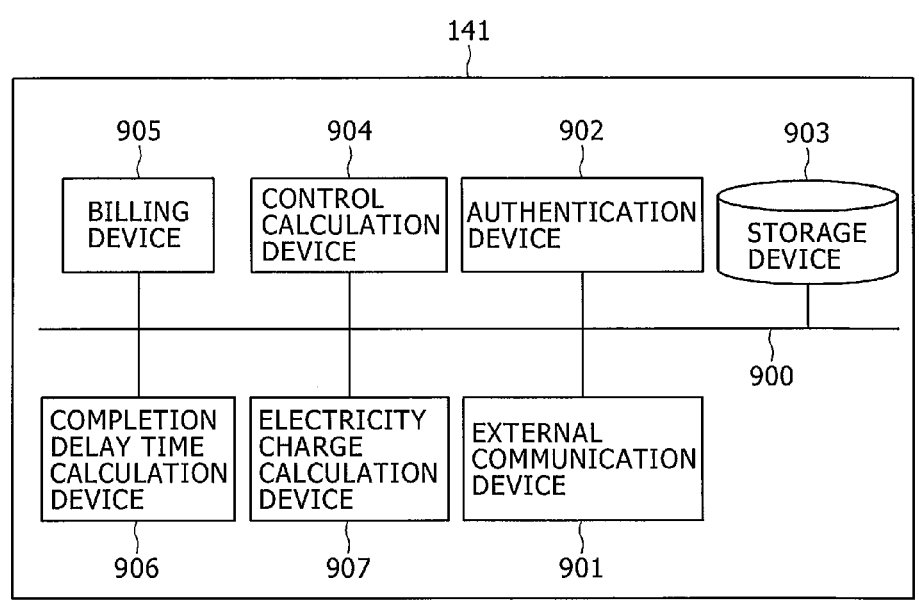
FIG. 13 shows an example of the configuration of the control center.

Next, the configuration of the control center 141 will be described below referring to FIG. 13. The control center 141 comprises an external communication device 901, an authentication device 902, a storage device 903, a control calculation device 904, a billing device 905, a completion delay time calculation device 906, an electricity charge calculation device 907, and a communication line (communication bus) 900. The external communication device 901 communicates with the external communication device of the storage battery system interconnection control device installed in each EV.

Figure 14:
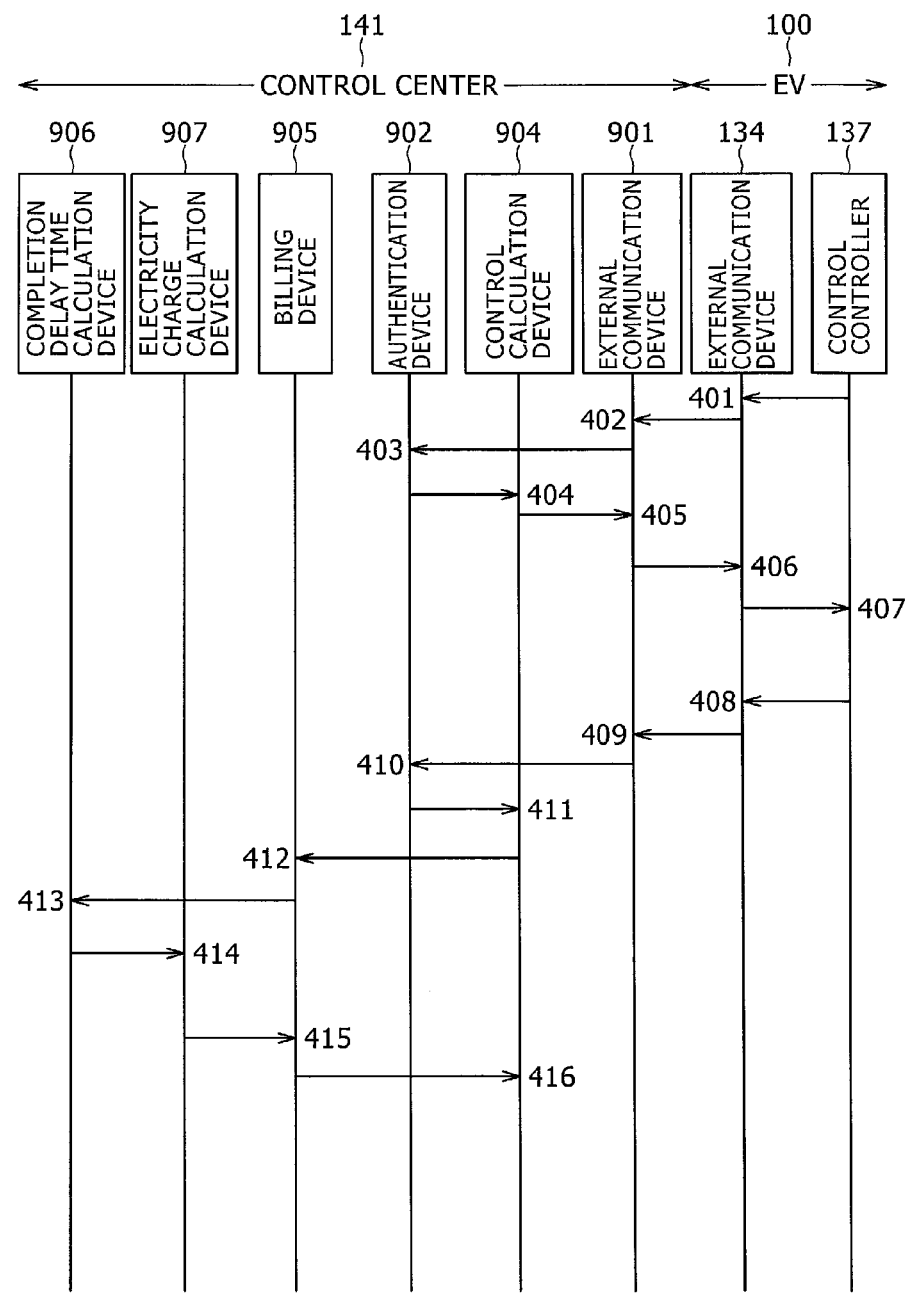
FIG. 14 is a sequence chart showing an example of processing by the control center.

Next, the operation of the control center 141 will be described below referring to FIG. 14. In FIG. 14, the external communication device 134 and the control controller 137 represent the functions of the storage battery system interconnection control device installed in the EV. The external communication device 901, the control calculation device 904, the authentication device 902, the billing device 905, the electricity charge calculation device 907 and the completion delay time calculation device 906 represent the functions of the control center 141. In the example of FIG. 14, the EV is connected to the electric power system and makes access to the control center 141 for the billing for the EV battery charging. The battery charging is carried out at charging electric energy per unit time (charging electric power) lower than the charging requirement of the EV battery.

In the first step 401, data regarding charging starting information, the ID number of the EV, the charging electric energy per unit time (charging electric power) at the time of charging and the SOC of the storage battery is sent from the EV's control controller to the external communication device 134. The data is transmitted to the external communication device 901 of the control center 141 via the communication circuit 181 (step 402). The external communication device 901 sends the received data to the authentication device 902 in order to check whether the received data is from an authorized user or not (step 403). The authentication device 902 performs the user authentication based on the received data and informs the control calculation device of the result of the user authentication (step 404) in order to retain data necessary for the subsequent electricity charge calculation and billing. The control calculation device transfers the user information (sent in the step 404) to the external communication device 901 (step 405). The user information is transmitted to the external communication device 134 of the EV, by which the EV is informed that the user authentication has been performed normally (step 407).

When the battery charging is finished on the EV's side; charging completion information (e.g., charging completion time and the charging quantity) is sent to the external communication device 134 of the EV (step 408) and data regarding the charging completion information is transmitted to the external communication device 901 of the control center (step 409). The authentication device performs the user authentication in order to check whether the data received by the external communication device 901 is from an authorized user or not (step 410) and sends the authentication result to the control calculation device 904 (step 411). Thereafter, the control calculation device 904 sends data regarding the aforementioned charging start time and charging completion time and the charging total quantity acquired in the step 411 to the billing device 905 (step 412).

The billing device 905 judges whether the battery charging was carried out at charging electric energy per unit time (charging electric power) lower than the charging requirement of the EV battery or not based on the charging electric energy per unit time (charging electric power). If the charging electric energy per unit time (charging electric power) was lower than the charging requirement of the EV battery, the completion delay time calculation device 906 performs the calculation of the delay time. The delay time calculated in the same way as the calculation method explained referring to FIG. 5. The calculated delay time is sent to the electricity charge calculation device 907 (step 414). The electricity charge calculation device determines the discount (amount of discount) corresponding to the delay time and sends the result to the billing device (step 415). The data sent to the billing device 905 in the step 415 is transferred to the control calculation device (step 416). The data sent to the control calculation device are recorded and stored in the storage device 903 as a set of data containing at least a user ID, charging date/time, the start time, the completion time, the charging overtime and the electricity charge. The data accumulated in the storage device 903 are used as a database for the billing.

As described above, according to the fourth embodiment of the present invention, the electric vehicle is equipped with the system interconnection control device which is characterized by the step of calculating the voltage drop by applying the load current at the time of performing the charging (targeting a charging system of the type called "Regulated") from the electric power system to the storage battery of the electric vehicle and the step of controlling the charging quantity of the electric vehicle based on the voltage drop. Further, the communication between each electric vehicle and the control center makes it possible to restrict the charging quantity of each electric vehicle so as to maintain the voltage stability in the whole electric power system according to the control commands from the control center. Consequently, the surrounding voltages can be maintained stably even when a plurality of electric vehicles are charged all at once. Furthermore, the cooperation with the billing/authentication system facilitates the management of the battery charging fees on both the control center's side and the EV's side.

Fifth Embodiment

Figure 15:
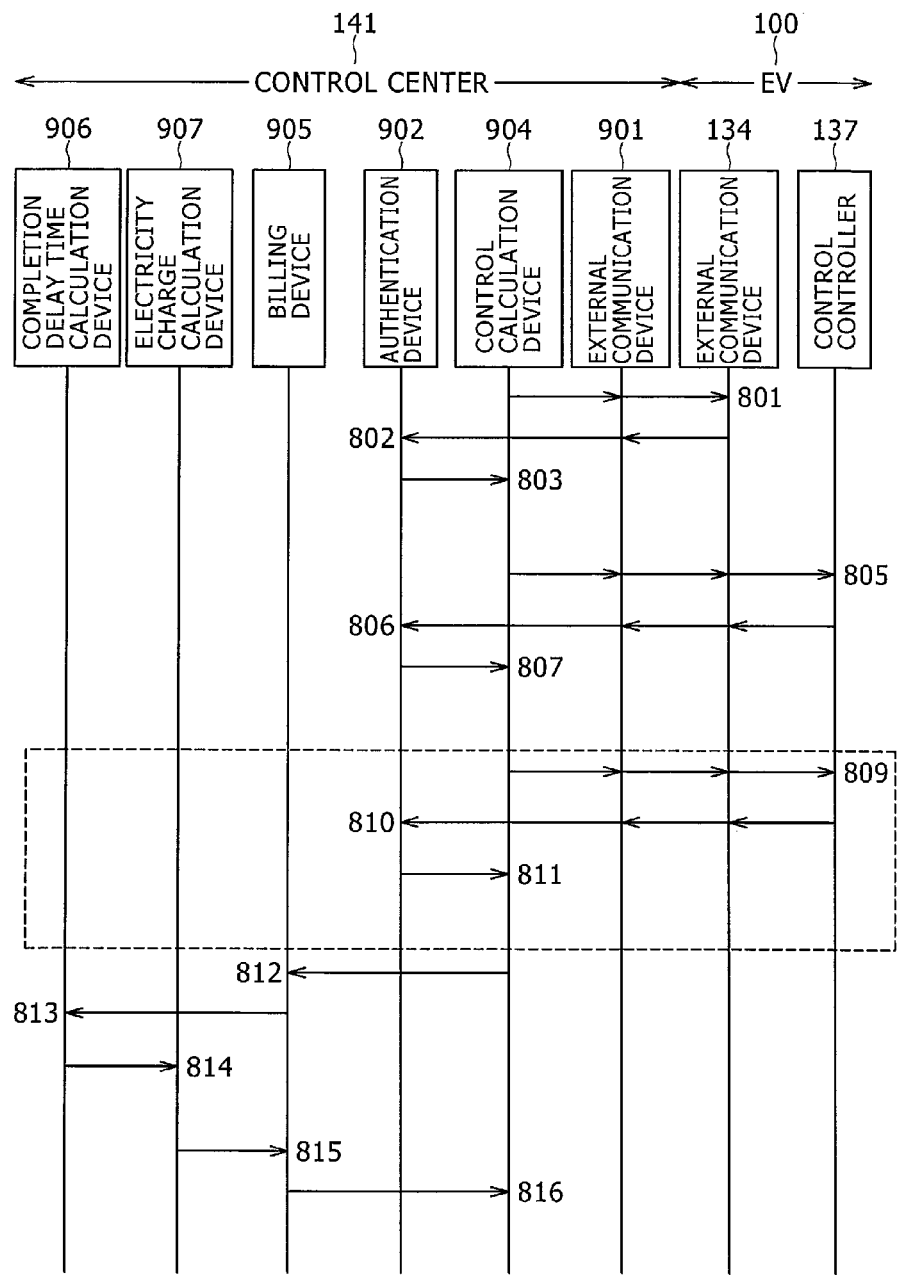
FIG. 15 is a sequence chart showing another example of processing by the control center.

A fifth embodiment of the present invention will be described below with reference to figures. The block diagram for implementing the fifth embodiment is equivalent to FIG. 12. FIG. 15 shows an embodiment in which the battery charging of each EV is controlled from the control center. This type of embodiment is suitable when the charging system called "Non-Regulated" (proposed to IEC by Germany as a standard specification) is employed. To implement this control, it is necessary to recognize whether each EV has been connected or not by means of communication. Thus, the following explanation will be given by using an example in which the storage battery system interconnection control device 201 is equipped with the PLC modem 212 as in the configuration shown in FIG. 12.

In the first step 801, the control center checks whether an EV has been connected or not via the external communication devices 901 and 134 when a charging request is issued from the control calculation device of the control center 141 to an EV user previously registered in the storage device 903. The check on the EV's side is possible by the external communication device 134 by judging whether the EV has been connected via the PLC modem 212 or not based on data arriving at the external communication device 134. The authentication device of the control center receiving the result of the check judges whether the result is a response from an authorized EV user or not (step 802). The result of the authentication by the authentication device 902 is sent to the control calculation device (step 803). Subsequently, in order to determine the charging quantity based on how much the EV battery can be charged, the control calculation device 904 transmits a command (for acquiring data regarding the SOC and the charging requirement quantity per unit time (at the time of charging) of the EV (target of charging) via the control controller of the EV in step 805) to the EV. In response to the command, the control controller 137 transmits the requested data to the control center via the external communication devices 134 and 901. In the control center, the authentication device 902 performs the user authentication (step 806) in order to check whether the data is from the correct user or not. The result of the authentication (step 806) is sent to the control calculation device (step 807) and data regarding the execution of EV charging are accumulated in the storage device 903. Thereafter, a charging command is issued to the EV via the control calculation device 904, the external communication device 901 and the control controller 137 (step 809). The EV starts the charging according to the command. In order to periodically inform the control center that the charging is in progress, the EV transmits an in-charging signal to the control center (step 811) after undergoing the user authentication by the control center (step 810). When the charging is finished, a charging completion signal is transmitted to the billing device 905 (step 812).

The billing device 905 judges whether the battery charging was carried out at charging electric energy per unit time (charging electric power) lower than the charging requirement of the EV battery or not based on the charging electric energy per unit time (charging electric power). If the charging electric energy per unit time (charging electric power) was lower than the charging requirement of the EV battery, the completion delay time calculation device 906 performs the calculation of the delay time. The delay time is calculated in the same way as the calculation method explained referring to FIG. 5. The calculated delay time is sent to the electricity charge calculation device 907 (step 814). The electricity charge calculation device determines the discount (amount of discount) corresponding to the delay time and sends the result to the billing device (step 815). The data sent to, the billing device 905 in the step 815 is transferred to the control calculation device (step 816). The data sent to the control calculation device are recorded and stored in the storage device 903 as a set of data containing at least the user ID, the charging date/time, the start time, the completion time, the charging overtime and the electricity charge. The data accumulated in the storage device 903 are used as a database for the billing.

Figure 16:
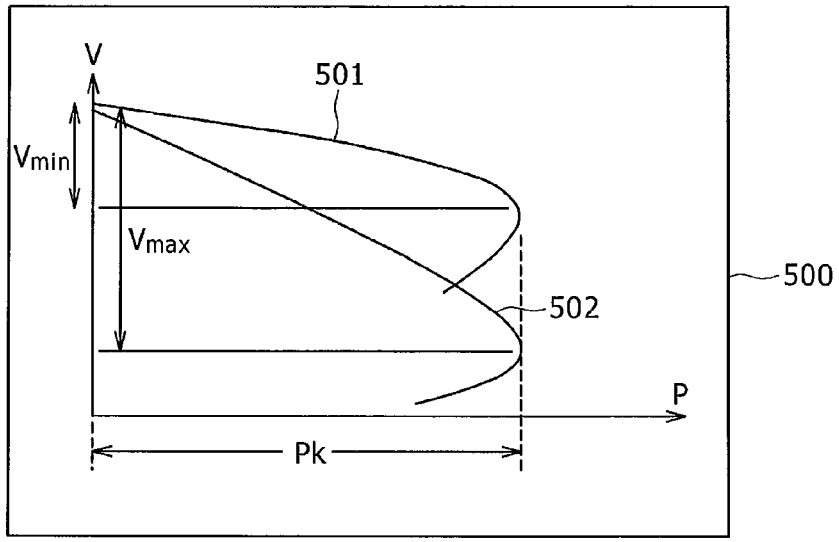
FIG. 16 shows an example of a PV curve.
Figure 17:
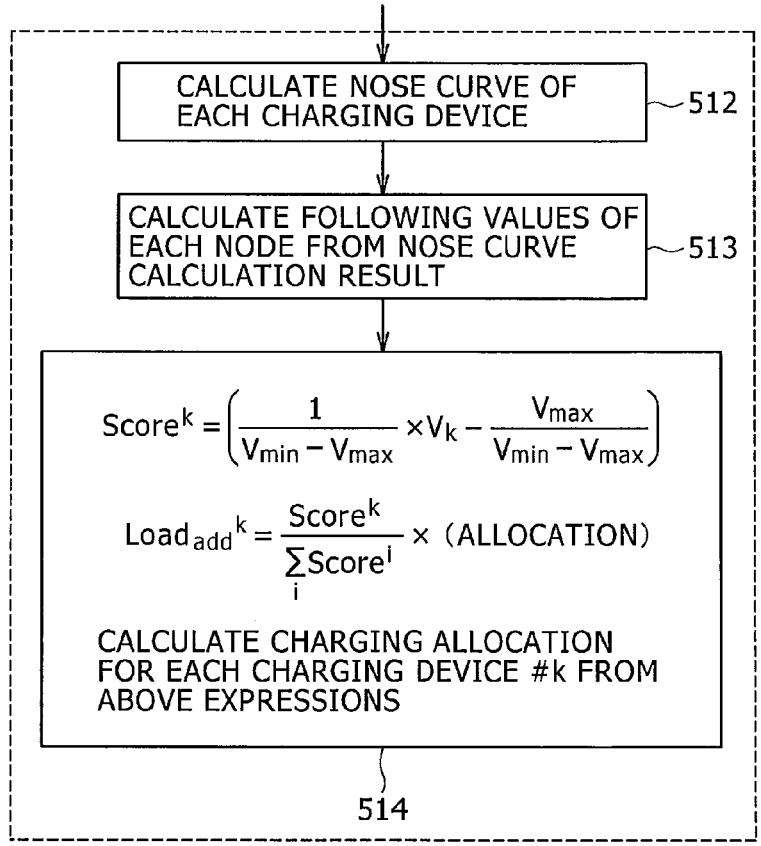
FIG. 17 shows an example of a method for allocating charging quantities.

Next, an example of a method for the control calculation device 904 in the embodiment explained referring to FIG. 15 for previously setting (allocating) charging quantities to a plurality of EVs will be explained below referring to FIGS. 16 and 17. FIG. 16 is a graph called a PV curve which is used for calculating the voltage drop at each point when a limit load is determined from the electric power load at the present time in the electric power system to which the EV under consideration is connected. In the graph 500, two PV curves 501 and 502 are shown. These curves indicate that the voltage stability becomes higher as the decrease in the vertical axis direction caused by an increase in the horizontal axis direction becomes smaller. Therefore, it is desirable that the battery charging be executed to an EV. that is situated at a point where the voltage does not drop in spite of an increase in the load. The limit value of the load is defined as Pk, the voltage at a point where the voltage drops the most (among the points to which a lot of EVs are connected) when the load reaches the limit value is defined as Vmin, and the voltage at a point where the voltage drops the least (among the points to which a lot of EVs are connected) when the load reaches the limit value is defined as Vmax.

Here, a method for allocating the charging quantity to each EV based on the determined Vmin and Vmax will be explained referring to FIG. 17. In the first step 512, data for generating the PV curve at each charging device (nose curve) are calculated. An example of the data for generating the PV curve is shown in FIG. 18. The reference character 250 in FIG. 18 represents an example of the format of data regarding power lines and transformers in the whole electric power system to which EVs are connected (hereinafter referred to as "branches"). The branch name, the resistive component, the inductive component, the capacitive component and the tap ratio of each branch are stored in the data in the PU (per unit) representation. The reference character 251 in FIG. 18 represents an example of the format of data regarding each load (node). The data regarding each node includes the node name, the presence/absence of a generator, a voltage specified value, a voltage initial value, active power output of the generator, reactive power output of the generator, active power of the load, reactive power of the load, the presence/absence of phase modifying equipment, and the capacity of the phase modifying equipment. After generating the PV curves by using such data, the charging quantity for each EV is determined by using the expressions shown in step 514 in FIG. 17 based on the values of Vmin and Vmax determined in step 513 from the graph of FIG. 16.

As described above, according to the fifth embodiment of the present invention, the electric vehicle is equipped with the system interconnection control device which is characterized by the step of calculating the voltage drop by applying the load current at the time of performing the charging (targeting a charging system of the type called "Non-Regulated") from the electric power system to the storage battery of the electric vehicle and the step of controlling the charging quantity of the electric vehicle based on the voltage drop. Further, the communication between each electric vehicle and the control center makes it possible to restrict the charging quantity of each electric vehicle so as to maintain the voltage stability in the whole electric power system according to the control commands from the control center. Consequently, the surrounding voltages can be maintained stably even when a plurality of electric vehicles are charged all at once. Furthermore, the cooperation with the billing/authentication system facilitates the management of the battery charging fees on both the control center's side and the EV's side.

Sixth Embodiment

Figure 19:
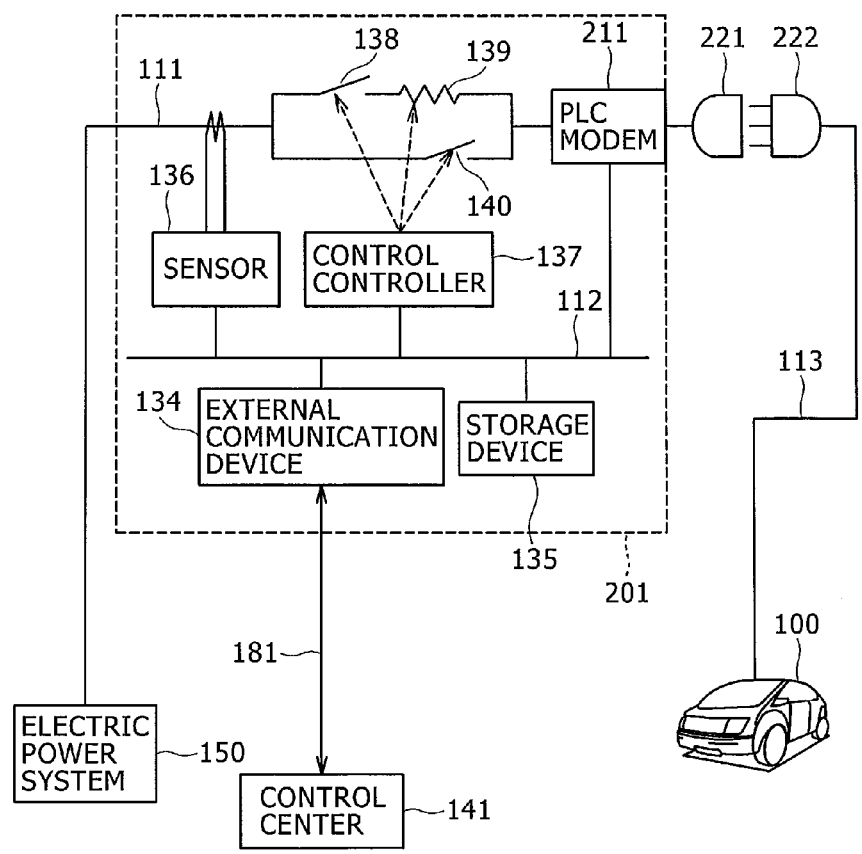
FIG. 19 shows an example of the configuration of a storage battery system interconnection control device installed in a charging station connected to a control center.

A sixth embodiment of the present invention will be described below with reference to figures. FIG. 19 shows an embodiment in which a storage battery system interconnection control device in accordance with the present invention is installed as a component of a charging station for electric vehicles and the storage battery system interconnection control device is equipped with an external communication device to be capable of communicating data with a control center outside the charging station.

The details of the functional components shown in FIG. 19 are equivalent to those in the second and fifth embodiments. The procedures in this embodiment are also equivalent to those in the second and fifth embodiments.

As described above, according to the sixth embodiment of the present invention, the charging station for electric vehicles is equipped with the system interconnection control device which is characterized by the step of calculating the voltage drop by applying the load current at the time of performing the charging (targeting a charging system of the type called "Non-Regulated") from the electric power system to the storage battery of the electric vehicle and the step of controlling the charging quantity of the electric vehicle based on the voltage drop. Further, the communication between each electric vehicle and the control center makes it possible to restrict the charging quantity of each electric vehicle so as to maintain the voltage stability in the whole electric power system according to the control commands from the control center. Consequently, the surrounding voltages can be maintained stably even when a plurality of electric vehicles are charged all at once. Furthermore, the cooperation with the billing/authentication system facilitates the management of the battery charging fees on both the control center's side and the EV's side.

Seventh Embodiment

Figure 20:
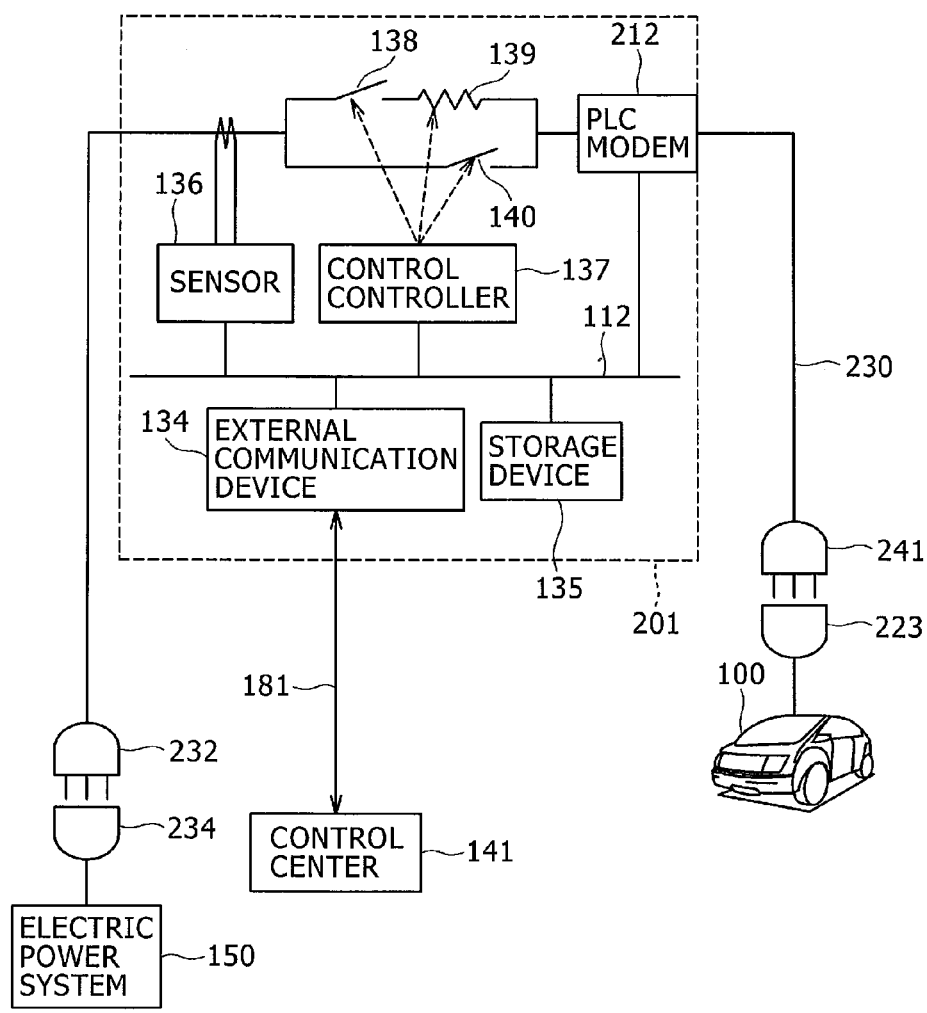
FIG. 20 shows an example of the configuration of a storage battery system interconnection control device installed in an electric vehicle charging cable connected to a control center.

A seventh embodiment of the present invention will be described below with reference to figures. FIG. 20 shows an embodiment in which a storage battery system interconnection control device in accordance with the present invention is installed as a component of an electric vehicle charging cable and the storage battery system interconnection control device is equipped with an external communication device to be capable of communicating data with a control center outside the charging cable.

The details of the functional components shown in FIG. 20 are equivalent to those in the third and fifth embodiments. The procedures in this embodiment are also equivalent to those in the third and fifth embodiments.

As described above, according to the seventh embodiment of the present invention, the electric vehicle charging cable is equipped with the system interconnection control device which is characterized by the step of calculating the voltage drop by applying the load current at the time of performing the charging (targeting a charging system of the type called "Non-Regulated") from the electric power system to the storage battery of the electric vehicle and the step of controlling the charging quantity of the electric vehicle based on the voltage drop. Further, the communication between each electric vehicle and the control center makes it possible to restrict the charging quantity of each electric vehicle so as to maintain the voltage stability in the whole electric power system according to the control commands from the control center. Consequently, the surrounding voltages can be maintained stably even when a plurality of electric vehicles are charged all at once. Furthermore, the cooperation with the billing/authentication system facilitates the management of the battery charging fees on both the control center's side and the EV's side.

As described above, according to the first, second and third embodiments, an electric vehicle, a charging station or a control box of a charging cable is equipped with the system interconnection control device which is characterized by the step of calculating the voltage drop by applying the load current at the time of performing the charging from the electric power system to the storage battery of the electric vehicle and the step of controlling the charging quantity of the electric vehicle based on the voltage drop. These embodiments make it possible to control the charging quantity of the electric vehicle so as to reduce the ill effects on the surrounding loads in the electric power system to which the electric vehicle is connected. Consequently, it becomes possible in an autonomous distributed manner to maintain the surrounding voltages at a certain level or higher even when a lot of electric vehicles are charged all at once.

According to the fourth, fifth, sixth and seventh embodiments, an electric vehicle is equipped with the system interconnection control device which is characterized by the step of calculating the voltage drop by applying the load current at the time of performing the charging from the electric power system to the storage battery of the electric vehicle and the step of controlling the charging quantity of the electric vehicle based on the voltage drop. Further, the communication between each electric vehicle and the control center makes it possible to restrict the charging quantity of each electric vehicle so as to maintain the voltage stability in the whole electric power system according to the control commands from the control center. Consequently, the surrounding voltages can be maintained at a certain level or higher even when a plurality of electric vehicles are charged all at once. Furthermore, the cooperation with the billing/authentication system facilitates the management of the battery charging fees on both the control center's side and the EV's side.

While the above description has been given of several preferred embodiments, the present invention is not to be restricted to the particular illustrative embodiments. It is apparent to those skilled in the art that a variety of alterations and modifications are possible within the spirit of the present invention and the scope of the appended claims.

DESCRIPTION OF REFERENCE CHARACTERS

100 electric vehicle
101 storage battery system interconnection control device
131 battery
132 battery controller
134, 901 external communication device
135 storage device
136 sensor
137 control controller
138, 140 switch
139 load resistor
150 electric power system
211, 212 PLC modem
225 charging plug
226 inlet
900 communication line 902 authentication device
903 storage device
904 control calculation device
905 billing device
906 completion delay time calculation device
907 electricity charge calculation device

The invention claimed is:

1. A storage battery control device comprising:
a calculation unit which calculates a voltage drop caused to an electric power system when a storage battery is connected to the system;
a resistor element having a resistance value set by a control unit;
a control device that controls a charging load on the storage battery;
a sensor that measures an electric current value and a voltage value of a load current applied from the electric power system to the storage battery,
wherein the voltage drop is calculated based on a difference in a voltage value measured when the load current passes through the resistor element and when the load current does not pass through the resistor element when the load current is applied from the electric power system to the storage battery,
wherein the control unit outputs the control command signal based on the calculated voltage drop to the control device that controls the charging load on the storage battery, and
wherein the control command signal is a resistance setting signal for setting the resistance value of the resistor element for limiting the electric current supplied from the electric power system to the storage battery.

2. The storage battery control device according to claim 1, wherein the resistance value is determined so that the voltage drop remains within a prescribed range.

3. The storage battery control device according to claim 2, comprising:
a first switch which blocks or conducts the electric current supplied from the electric power system to the storage battery via the load limiting element; and
a second switch which blocks or conducts electric current supplied from the electric power system to the storage battery bypassing the load limiting element,
wherein the control unit outputs a signal for controlling the blockage/conduction of the first and second switches.

4. The storage battery control device according to claim 1, wherein the control unit receives an electric power requirement quantity regarding the charging of the storage battery, calculates a charging plan for the storage battery based on the electric power requirement quantity so that the voltage drop remains within a prescribed range, and outputs the control command signal according to the calculated charging plan.

5. The storage battery control device according to claim 4, wherein some of the information is communicated according to a power line communication protocol.

6. The storage battery control device according to claim 4, comprising a charging time comparison unit which compares a charging time in the charging plan with a predetermined charging time,
wherein an alarm signal is outputted based on the result of the comparison.

7. The storage battery control device according to claim 1, comprising a billing calculation unit which calculates a billing quantity based on the load on the storage battery from the electric power system.

8. The storage battery control device according to claim 1, wherein
a load allocation indicating the amount of allocation to the storage battery from the electric power system is acquired, and
the load on the storage battery from the electric power system is limited according to the load allocation.

* * * * *